United States Patent
Maxwell et al.

(10) Patent No.: US 12,404,017 B2
(45) Date of Patent: Sep. 2, 2025

(54) METHOD FOR IMPROVING LOSS OF LUBE SURVIVAL

(71) Applicant: Textron Innovations Inc., Providence, RI (US)

(72) Inventors: John N. Maxwell, Keller, TX (US); Nick J. Jones, Fort Worth, TX (US)

(73) Assignee: Textron Innovations Inc., Providence, RI (US)

( * ) Notice: Subject to any disclaimer, the term of this patent is extended or adjusted under 35 U.S.C. 154(b) by 125 days.

(21) Appl. No.: 17/979,447

(22) Filed: Nov. 2, 2022

(65) Prior Publication Data

US 2024/0141981 A1   May 2, 2024

(51) Int. Cl.
*B64C 27/12*   (2006.01)
*F16H 57/04*   (2010.01)

(52) U.S. Cl.
CPC ........... *B64C 27/12* (2013.01); *F16H 57/041* (2013.01); *F16H 57/0412* (2013.01); *B23P 2700/01* (2013.01)

(58) Field of Classification Search
CPC .... F16H 57/023; F16H 57/032; F16H 57/041; F16H 57/0412; F16H 57/0419; F16H 2057/02043; B64C 27/12; B23P 2700/01; Y10T 29/49707
See application file for complete search history.

(56) References Cited

U.S. PATENT DOCUMENTS

| | | | |
|---|---|---|---|
| 7,338,379 B2 * | 3/2008 | Mancuso | F16D 9/08 384/126 |
| 10,697,586 B2 * | 6/2020 | Poster | F16H 57/0482 |
| 10,920,869 B2 * | 2/2021 | Gerges | F16H 57/0423 |
| 11,326,683 B2 * | 5/2022 | Xu | B23P 15/00 |
| 11,391,362 B2 * | 7/2022 | Savage | F16H 57/0456 |
| 2014/0001307 A1 * | 1/2014 | Ehinger | F16H 57/0471 184/26 |

FOREIGN PATENT DOCUMENTS

| | | | | |
|---|---|---|---|---|
| DE | 19852249 A1 * | 6/1999 | | F16H 15/38 |
| KR | 20210081762 A * | 7/2021 | | |
| LU | 101812 B1 * | 11/2021 | | F16D 1/0864 |
| WO | WO-2019235218 A1 * | 12/2019 | | C22C 23/00 |

OTHER PUBLICATIONS

Yellowbullet.com; https://www.yellowbullet.com/threads/is-painting-a-transmission-a-bad-idea.2668706/; Obtained on Apr. 11, 2024. (Year: 2021).*

(Continued)

*Primary Examiner* — Adam D Rogers
(74) *Attorney, Agent, or Firm* — Frost Brown Todd LLP

(57) ABSTRACT

Methods and apparatuses are described to increase emissivity within a gearbox. Loss-of-lube conditions can cause a gearbox in a vehicle to quickly heat up and fail, which could lead to loss of aircraft and/or life. Surface treatments within a gearbox, such as black paint, black oxide coatings, shot-peening, and others, can increase emissivity within the gearbox. The increased emissivity can increase heat transfer via radiation, leading to longer operational capabilities during loss-of-lube conditions.

11 Claims, 4 Drawing Sheets

(56) References Cited

OTHER PUBLICATIONS

Coating Technologies, LLC; Black Oxide Coatings for Helicopter Transmission Components; https://coatingtechnologiesllc.com/2016/07/black-oxide-coatings-for-helicopter-transmission-components/; Published on Jul. 14, 2016 (Year: 2016).*

GearSolutions.com; Black Oxide Finishing for Gears; https://gearsolutions.com/features/black-oxide-finishing-for-gears/; Published on Mar. 1, 2010 (Year: 2010).*

MachineDesign.com; Shot peening increases gear life; https://www.machinedesign.com/materials/metals/article/21832018/shot-peening-increases-gear-life; Published on May 1, 2000 (Year: 2000).*

Machine translation of WO 2019/235218 A1 obtained on May 1, 2024.*

* cited by examiner

METHOD FOR IMPROVING LOSS OF LUBE SURVIVAL

STATEMENT REGARDING FEDERALLY SPONSORED RESEARCH OR DEVELOPMENT

This invention was made with U.S. Government support under Agreement No. W9124P-19-9-0001 awarded by the Army Contracting Command-Redstone Arsenal to the AMTC and a related AMTC Project Agreement 19-08-006 with Bell Textron Inc. The Government has certain rights in the invention.

TECHNICAL FIELD

The present disclosure is directed to gear systems and heat transfer solutions.

BACKGROUND OF THE INVENTION

Helicopter gearboxes are required to survive a duration of time in a condition where lubrication has been lost on the aircraft. This is typically a challenging requirement to meet in the lab, but more importantly, in the field it can be the difference between life and death of the crew. Lubrication is often thought of in the context of facilitating movement between sliding parts. However, in a gearbox, a larger concern is heat management and dissipation. These tests typically show a slowly rising heat, followed by a spike seconds before failure. This is typically interpreted as the gears perform acceptably until they reach a critical temperature at which the steel begins to soften and loses its hardness. The prior art provides no solutions to surviving loss of lubricant in an aircraft for any extended period of time.

BRIEF SUMMARY OF THE INVENTION

One embodiment under the present disclosure comprises a gearbox. The gearbox comprises a shaft configured to drive at least one other component in a vehicular drive system. It also comprises a housing configured to at least partially surround the shaft; and further comprises a surface treatment applied to an inner facing surface of the housing, the surface treatment configured to increase emissivity within the housing.

Another embodiment under the present disclosure comprises a method of increasing emissivity in a gearbox. The method includes applying one or more surface treatments to at least one surface within a gearbox, the one or more surface treatments configured to increase emissivity.

A further embodiment under the present disclosure comprises a method of increasing emissivity in a gearbox. The method includes disassembling at least a portion of a gearbox to access one or more components of the gearbox. A further step is applying one or more surface treatments to one or more surfaces of the one or more components, the one or more surface treatments configured to increase emissivity within the gearbox. A further step is assembling the one or more components into the gearbox.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

Embodiments under the present disclosure includes the treatment of the surface of internal components to a gearbox to maximize emissivity, $\varepsilon$, of the surfaces and facilitate radiation heat transfer from moving components to the case. While benefits can be seen during normal operation of the gearbox embodiments described, the embodiments described can provide increased benefits in loss-of-lube conditions. If an aircraft or other vehicle experiences a loss of lube within a gearbox, then it is likely that the gearbox could fail in a relatively short amount of time. Extending operation, even by seconds, can provide valuable time for landing, escaping from dangerous condition, avoiding bystanders, or otherwise avoiding danger or destruction of people, the vehicle itself, buildings, or other at-risk locations or individuals. Benefits of various embodiments include improving survivability in loss-of-lube condition, no increased weight, no degradation of performance, negligible increase in cost.

In loss-of-lube (LoL) condition the heat within a gearbox can begin rising considerably. At low $\Delta T$'s, radiation is not typically considered as a viable means of heat removal. However, because internal components reach very high temperatures (possibly up to 1500° F.), the radiation element is a significant contributor to controlling heat during a LoL condition because the relationship is to the 4th power:

$$q = \sigma A_1 \varepsilon_1 (T_1^4 - T_2^4)$$

Here, $A_1$ is a surface area of the emitting surface; q is the heat transfer by radiation; $\varepsilon$ is emissivity. $T_1$ is the temperature of the heat generating elements where $A_1$ is located, such as moving components in a gearbox. $T_2$ is the temperature of the inner surface of the gearbox. The Stefan-Boltzmann constant is $\sigma = 5.67 \times 10^{-8}$ J/s·m2·K$^4$.

Typically, an engineer or designer may not be able to maximize the viewable area, A1, for the gearbox design without adding a lot of weight. However, the emissivity, $\varepsilon 1$, value can range between 0.05 for a polished surface to 0.95 for a surface painted black. Surface treatments such as shot-peening, black oxide, paint, etc., tend to fall between 0.2 and 0.95.

Figure 1:
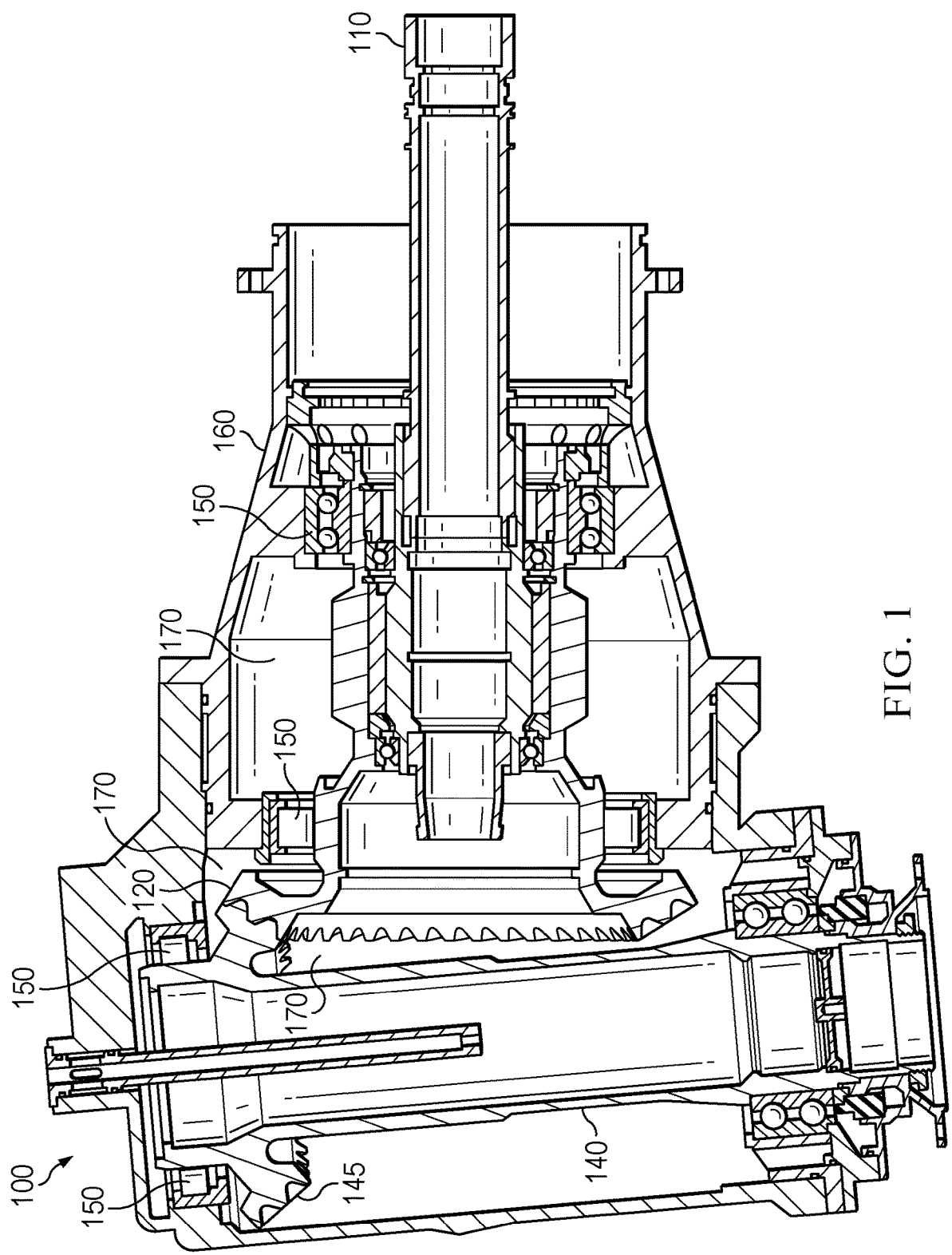
FIG. 1 illustrates a gearbox embodiment under the present disclosure.

FIG. 1 illustrates portions of a possible gearbox embodiment 100 under the present disclosure. Output shaft 110 comprises gear 120 on one end. Gear 120 engages with gear 145 on another shaft 140. Due to leaks or other failures, gearbox 100 may experience a LoL condition during use. Once gearbox 100 begins losing lubrication it will begin heating up and the gearbox is likely to cease working quickly. Heat generation can especially come from the gear mesh and bearings 150, but can come from other regions as well. Housing 160, during normal operation, keeps lubrication around various components within gearbox 100. Lubrication may splash around within various spaces 170, coating moving and stationary components, including bearings 150, gear 120, and other components. Passages, not shown here, may provide for lubricant to circulate between various spaces 170.

Figure 2:
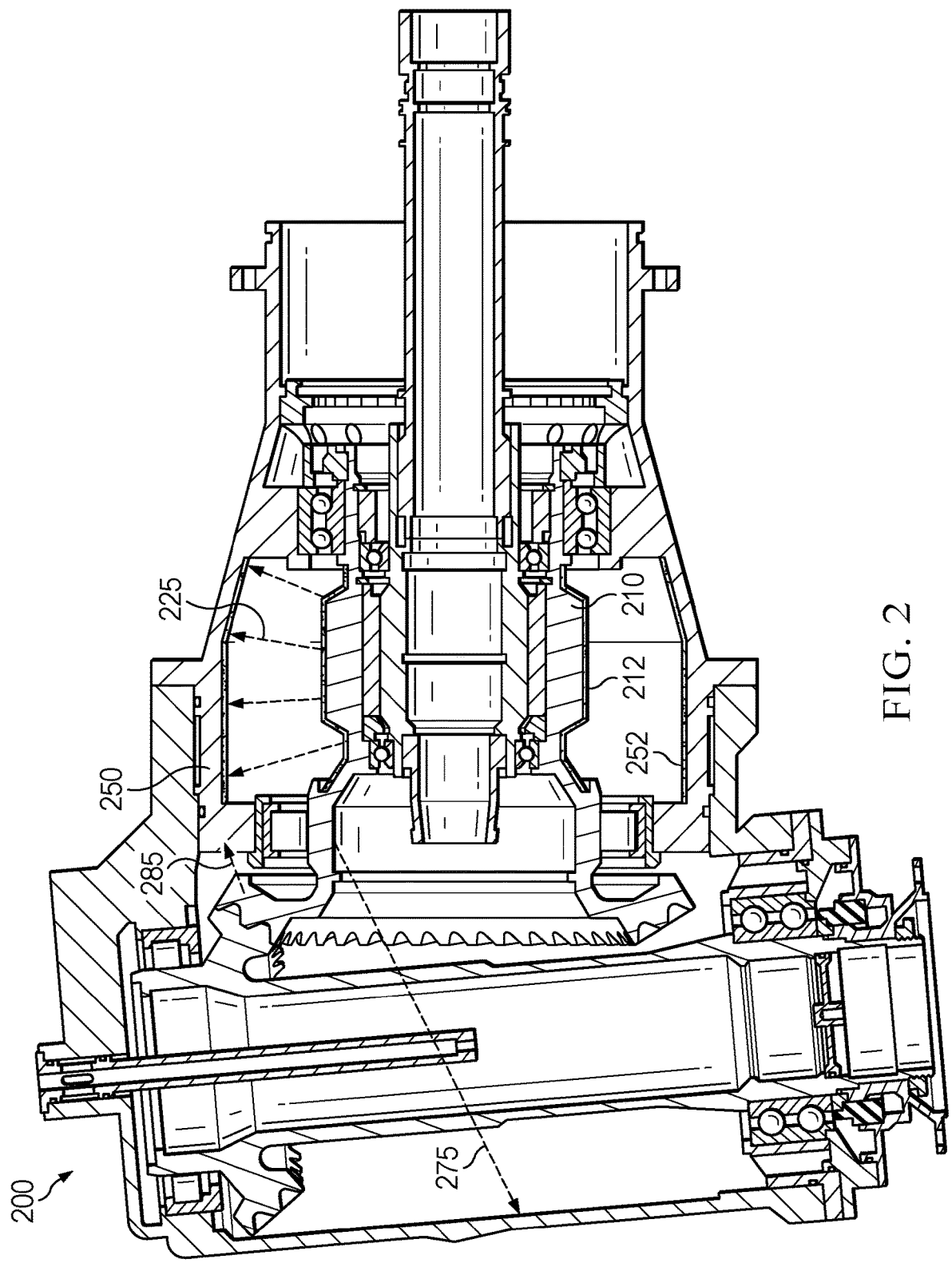
FIG. 2 illustrates a gearbox embodiment under the present disclosure.

FIG. 2 illustrates a gearbox embodiment under the present disclosure. Gearbox 200 comprises a drive shaft 210 and a housing 250. Radiation 225 occurs from an outer surface of drive shaft 210 to housing 220. Radiation 275, 285 occurs amongst other components and surfaces within gearbox 200. While description of the embodiment in FIG. 2 focuses on radiation 225, the embodiments described can be implemented at various location, surfaces and for various components in gearbox 200. In the embodiment shown in FIG. 2, surface treatments 212, 252 are used to increase emissivity and therefore increase heat transfer via radiation. In LoL conditions, this will increase heat transfer away from hot components, such as drive shaft 210, and toward housing 250 where some heat can be lost to the external environment. Surface treatment 212 has been applied to an external surface of drive shaft 210. Surface treatment 252 has been applied to an internal surface of housing 250. The surface treatment can comprise black paint, shot-peening, black oxide treatment, anodizing treatments, corrosion treatments, other paint colors, or other emissivity increasing treatments.

Reference has been made in FIGS. 1 and 2 to embodiments of gearboxes that utilize lubrication. But the present disclosure can be extended to dry shaft embodiments. Embodiments under the present disclosure include non-lube gearboxes where increased emissivity can be beneficial as well. There are various situations and embodiments where gearboxes can benefit from increased emissivity beside the LoL condition described in FIGS. 1 and 2. Furthermore, while it is preferred for multiple surfaces within a gearbox to have the surface treatments described herein (and to maximize the total surface area of surface treatments), in some embodiments it may be that only one surface can be so treated.

Figure 3:
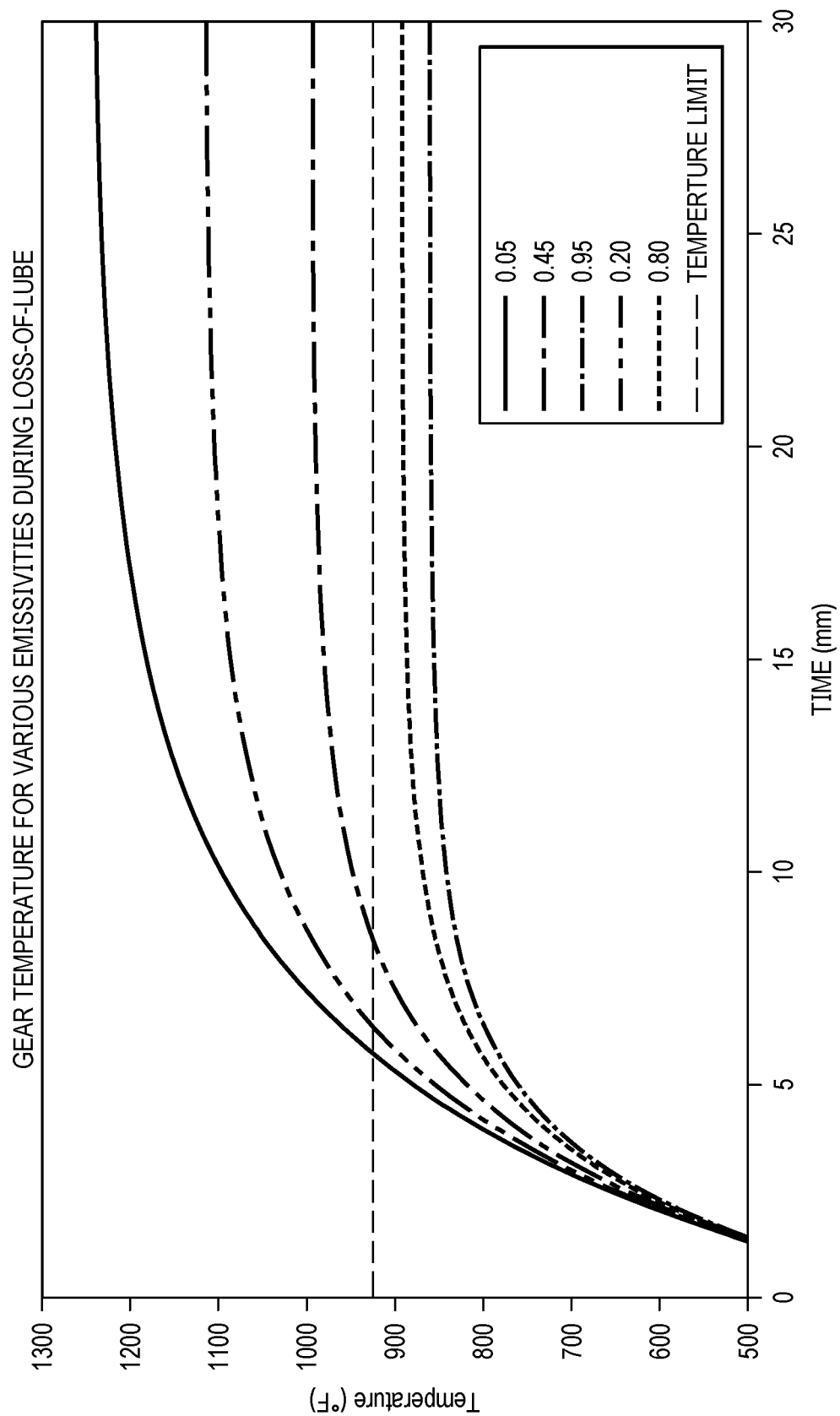
FIG. 3 illustrates the impact of emissivity changes on temperature in a gearbox experiencing loss-of-lube.

Applicant ran several thermal analyses using various emissivity values and resulting heat within a gearbox experiencing LoL The results are shown in FIG. 3. Results are shown for temperature of a gear within a gearbox in a LoL condition using various surface treatments and emissivities. As seen, a polished gear ($\varepsilon = 0.05$) would reach a temperature over 1200° F. after 30 minutes (typical test time), whereas one that has optimally been treated for radiation heat transfer ($\varepsilon = 0.95$) stays below 900° F. in the same time. Generally, a polished surface (e.g., mirror-like) would be a bad radiator. But darker colors and abraded or corroded surfaces, or treatments like anodization or oxidation, can yield better emissivity and better radiation.

As a point of reference, some gear steels used in aerospace, begin to lose their material properties near 900° F. A polished gear ($\varepsilon = 0.05$) crosses 900° F. after just over 5 minutes, whereas one optimized for radiation ($\varepsilon = 0.95$) stays below 900° F. for the duration of the test.

Figure 4:
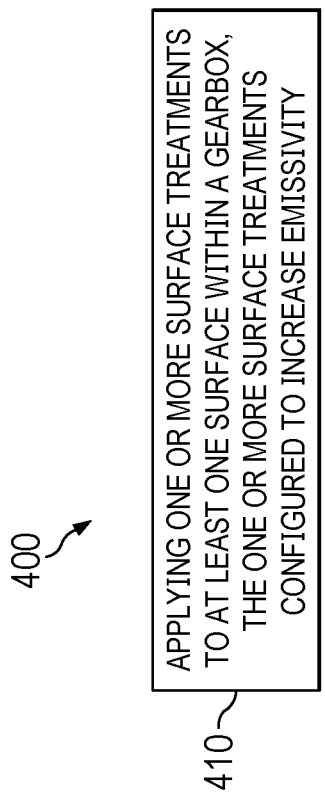
FIG. 4 illustrates a flow chart of a method embodiment under the present disclosure.

FIG. 4 illustrates a possible method embodiment 400 under the present disclosure. Method 400 is a method of increasing emissivity in a gearbox. Step 410 is applying one or more surface treatments to at least one surface within a gearbox, the one or more surface treatments configured to increase emissivity. Method 400 can comprise a variety of extra steps or variations. For example, the applying of surface treatments could occur at various steps in the manufacturing process. A surface treatment could be integrated into a component. Or it could be applied after manufacturing and during the assembly process of the gearbox. The surface treatment(s) could be applied at various locations within a gearbox. One preferable location is the inner surface of the housing. Another preferable location is along the shaft or a large area coupled around the shaft. Different surfaces can receive different surface treatments. Possible surface treatments include black paint, black oxide treatment, shot-peening and others. In some embodiments, one component can receive black oxide treatment while others receive shot-peening. In some embodiments, a single surface can receive multiple different treatments. For example, a single surface could be treated with shot-peening and then painted black.

Figure 5:
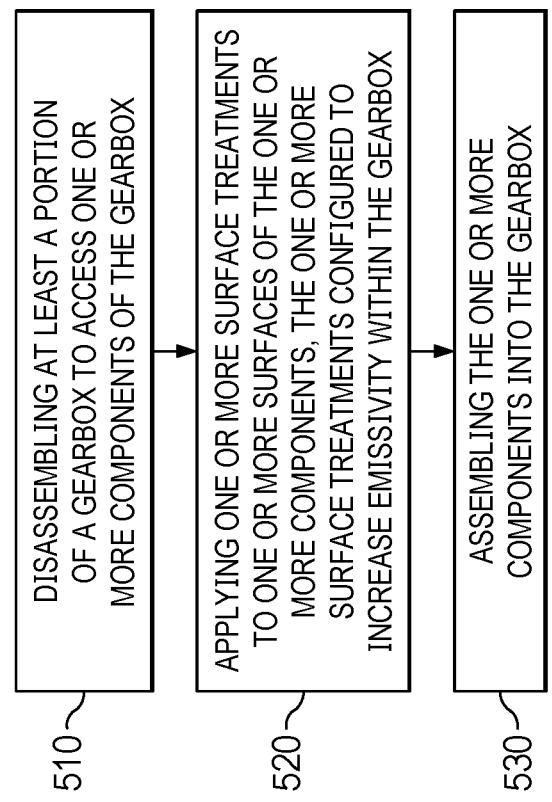
FIG. 5 illustrates a flow chart of a method embodiment under the present disclosure.

FIG. 5 displays another possible method embodiment 500 under the present disclosure. Method 500 is a method of increasing emissivity in a gearbox. Step 510 is disassembling at least a portion of a gearbox to access one or more components of the gearbox. Step 520 is applying one or more surface treatments to one or more surfaces of the one or more components, the one or more surface treatments configured to increase emissivity within the gearbox. Step 530 is assembling the one or more components into the gearbox. Method 500 can comprise a variety of extra steps or variations. Various different surface treatments can be utilized in the same gearbox, for example. Different surface treatments can be used on the same component. The disassembling can comprise complete disassembly or partial disassembly. Other variations are possible.

Abbreviations and Defined Terms

To assist in understanding the scope and content of this written description and the appended claims, a select few terms are defined directly below. Unless defined otherwise, all technical and scientific terms used herein have the same meaning as commonly understood by one of ordinary skill in the art to which the present disclosure pertains.

The terms "approximately," "about," and "substantially," as used herein, represent an amount or condition close to the specific stated amount or condition that still performs a desired function or achieves a desired result. For example, the terms "approximately," "about," and "substantially" may refer to an amount or condition that deviates by less than 10%, or by less than 5%, or by less than 1%, or by less than 0.1%, or by less than 0.01% from a specifically stated amount or condition.

Various aspects of the present disclosure, including devices, systems, and methods may be illustrated with reference to one or more embodiments or implementations, which are exemplary in nature. As used herein, the term "exemplary" means "serving as an example, instance, or illustration," and should not necessarily be construed as preferred or advantageous over other embodiments disclosed herein. In addition, reference to an "implementation" of the present disclosure or embodiments includes a specific reference to one or more embodiments thereof, and vice versa, and is intended to provide illustrative examples without limiting the scope of the present disclosure, which is indicated by the appended claims rather than by the present description.

As used in the specification, a word appearing in the singular encompasses its plural counterpart, and a word appearing in the plural encompasses its singular counterpart, unless implicitly or explicitly understood or stated otherwise. Thus, it will be noted that, as used in this specification and the appended claims, the singular forms "a," "an" and "the" include plural referents unless the context clearly dictates otherwise. For example, reference to a singular referent (e.g., "a widget") includes one, two, or more referents unless implicitly or explicitly understood or stated otherwise. Similarly, reference to a plurality of referents should be interpreted as comprising a single referent and/or a plurality of referents unless the content and/or context clearly dictate otherwise. For example, reference to referents in the plural form (e.g., "widgets") does not necessarily require a plurality of such referents. Instead, it will be appreciated that independent of the inferred number of referents, one or more referents are contemplated herein unless stated otherwise.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

CONCLUSION

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

It is understood that for any given component or embodiment described herein, any of the possible candidates or alternatives listed for that component may generally be used individually or in combination with one another, unless implicitly or explicitly understood or stated otherwise. Additionally, it will be understood that any list of such candidates or alternatives is merely illustrative, not limiting, unless implicitly or explicitly understood or stated otherwise.

In addition, unless otherwise indicated, numbers expressing quantities, constituents, distances, or other measurements used in the specification and claims are to be understood as being modified by the term "about," as that term is defined herein. Accordingly, unless indicated to the contrary, the numerical parameters set forth in the specification and attached claims are approximations that may vary depending upon the desired properties sought to be obtained by the subject matter presented herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the subject matter presented herein are approximations, the numerical values set forth in the specific examples are reported as precisely as possible. Any numerical values, however, inherently contain certain errors necessarily resulting from the standard deviation found in their respective testing measurements.

Any headings and subheadings used herein are for organizational purposes only and are not meant to be used to limit the scope of the description or the claims. The terms and expressions which have been employed herein are used as terms of description and not of limitation, and there is no intention in the use of such terms and expressions of excluding any equivalents of the features shown and described or portions thereof, but it is recognized that various modifications are possible within the scope of the present disclosure. Thus, it should be understood that although the present disclosure has been specifically disclosed in part by preferred embodiments, exemplary embodiments, and optional features, modification and variation of the concepts herein disclosed may be resorted to by those skilled in the art, and such modifications and variations are considered to be within the scope of this present description.

It will also be appreciated that systems, devices, products, kits, methods, and/or processes, according to certain embodiments of the present disclosure may include, incorporate, or otherwise comprise properties or features (e.g., components, members, elements, parts, and/or portions) described in other embodiments disclosed and/or described herein. Accordingly, the various features of certain embodiments can be compatible with, combined with, included in, and/or incorporated into other embodiments of the present disclosure. Thus, disclosure of certain features relative to a specific embodiment of the present disclosure should not be construed as limiting application or inclusion of said features to the specific embodiment. Rather, it will be appreciated that other embodiments can also include said features, members, elements, parts, and/or portions without necessarily departing from the scope of the present disclosure.

Moreover, unless a feature is described as requiring another feature in combination therewith, any feature herein may be combined with any other feature of a same or different embodiment disclosed herein. Furthermore, various well-known aspects of illustrative systems, methods, apparatus, and the like are not described herein in particular detail in order to avoid obscuring aspects of the example embodiments. Such aspects are, however, also contemplated herein.

All references cited in this application are hereby incorporated in their entireties by reference to the extent that they are not inconsistent with the disclosure in this application. It will be apparent to one of ordinary skill in the art that methods, devices, device elements, materials, procedures, and techniques other than those specifically described herein can be applied to the practice of the described embodiments as broadly disclosed herein without resort to undue experimentation. All art-known functional equivalents of methods, devices, device elements, materials, procedures, and techniques specifically described herein are intended to be encompassed by this present disclosure.

When a group of materials, compositions, components, or compounds is disclosed herein, it is understood that all individual members of those groups and all subgroups thereof are disclosed separately. When a Markush group or other grouping is used herein, all individual members of the group and all combinations and sub-combinations possible of the group are intended to be individually included in the disclosure.

The above-described embodiments are examples only. Alterations, modifications, and variations may be effected to the particular embodiments by those of skill in the art without departing from the scope of the description, which is defined solely by the appended claims.

What is claimed is:

1. A method of increasing emissivity in a gearbox, the gearbox comprising a housing, the method comprising:
   applying one or more surface treatments to an inner facing surface of the housing, the one or more surface treatments configured to increase the emissivity, wherein the applying is performed after the gearbox is at least partially assembled.

2. The method of claim 1, wherein the applying comprises applying a first surface treatment of the one or more surface treatments to the inner surface of the housing and a second surface treatment of the one or more surface treatments to another component within the housing.

3. The method of claim 1, further comprising applying a second one or more surface treatments to one or more surfaces within the gearbox.

4. The method of claim 3, wherein the second one or more surface treatments comprises a different surface treatment from the one or more surface treatments.

5. The method of claim 1, wherein the applying comprises applying the one or more surface treatments to the inner facing surface after the inner facing surface has been manufactured.

6. The method of claim 1, wherein the applying comprises integrating the one or more surface treatments into the inner facing surface during manufacture of the inner facing surface.

7. The method of claim 1, wherein the applying is performed before the gearbox is assembled together.

8. A method of increasing emissivity in a gearbox, comprising:
   disassembling at least a portion of the gearbox to access one or more components of the gearbox;
   applying one or more surface treatments to one or more surfaces of the one or more components, the one or more surface treatments configured to increase the emissivity within the gearbox; and
   assembling the one or more components into the gearbox.

9. The method of claim 8, wherein the applying comprises applying multiple different surface treatments to the same surface.

10. The method of claim 8, wherein the one or more surfaces treatments comprises one or more of: black paint; shot-peening; black oxide treatment.

11. The method of claim 8, wherein the one or more surfaces comprises at least one of: a surface of a shaft; a surface coupled to a bearing; an inward facing surface of a housing.

* * * * *